US012037937B1

(12) United States Patent
Valdivia

(10) Patent No.: US 12,037,937 B1
(45) Date of Patent: Jul. 16, 2024

(54) VARIABLE HEIGHT PISTONS FOR OPTIMIZING COMBUSTION PRESSURES IN INTERNAL COMBUSTION ENGINES

(71) Applicant: Francisco Azocar Valdivia, Santiago (CL)

(72) Inventor: Francisco Azocar Valdivia, Santiago (CL)

( * ) Notice: Subject to any disclaimer, the term of this patent is extended or adjusted under 35 U.S.C. 154(b) by 0 days.

(21) Appl. No.: 18/299,401

(22) Filed: Apr. 12, 2023

(51) Int. Cl.
*F02B 75/04* (2006.01)

(52) U.S. Cl.
CPC .................................. *F02B 75/044* (2013.01)

(58) Field of Classification Search
CPC ..................................................... F02B 75/044
USPC ........................................................ 123/48 B
See application file for complete search history.

(56) References Cited

U.S. PATENT DOCUMENTS 7,273,022 B2 9/2007 Valdivia
2006/0249103 A1* 11/2006 Valdivia ................ F02B 75/048 123/48 B

FOREIGN PATENT DOCUMENTS

SU 1213229 A1 * 2/1986 ............ F02B 75/044

* cited by examiner

*Primary Examiner* — Lindsay M Low
*Assistant Examiner* — Omar Morales
(74) *Attorney, Agent, or Firm* — Farber LLC

(57) ABSTRACT

A piston and connecting rod assembly including concentric primary and secondary pistons, the secondary piston being axially movable within the primary piston, toward a limit position therein, by a spring. The spring compression is controlled in part by a spring support which is axially movable within the primary piston. A cam lobe at the upper end of the connecting rod projects at an upward angle to the axis of the connecting rod. During a compression stroke the cam lobe causes displacement of the spring support, upward and then downward, initially increasing compression in the spring and then decreasing it as the connecting rod approaches a top dead center position, thus enabling the secondary piston to be positioned according to the size of the fuel charge, substantially independent of inertial forces acting on the secondary piston, to optimize the compression ratio to the fuel charge.

6 Claims, 2 Drawing Sheets

VARIABLE HEIGHT PISTONS FOR OPTIMIZING COMBUSTION PRESSURES IN INTERNAL COMBUSTION ENGINES

FIELD OF THE INVENTION

The invention relates to field of internal combustion engines and in particular to a novel and improved form of variable height piston having improved features for managing the effective height of the piston during the operating cycle for improved operating efficiency of the engine. This invention is closely related to my earlier U.S. Pat. No. 7,273,022, of Sep. 25, 2007, the entire content of which is incorporated herein by reference.

BACKGROUND OF THE INVENTION

In the field of internal combustion engines, it is generally established that higher compression ratios result in more intense combustion, delivering more power and greater operating efficiency. However, a typical internal combustion engine has a fixed compression ratio, by reason of a fixed geometry, and the engine functions at optimal efficiencies only when the fuel charge is at or near a maximum. When lower fuel charges are introduced, the effective compression of the fuel is reduced. My before mentioned U.S. Pat. No. 7,273,022 compensates for variability in the fuel charge by the use of a concentric secondary piston, supported by a spring and slideable axially within the primary piston. The secondary piston has a portion projecting into the combustion chamber and displacing a portion of the volume thereof. During a compression phase of the piston assembly, if there is a high load of fuel mixture in the chamber, the secondary piston is displaced downwardly against the force of the spring, which effectively enlarges the compression space while placing the fuel under a desired degree of compression. If there is a relatively lower load of the fuel mixture, the pressure forces acting on the secondary piston during the compression phase are lower. The spring supporting the secondary piston automatically responds to the amount of the fuel charge in the chamber during the compression phase to correspondingly adjust the size of the combustion chamber and the compression ratio thereof, and thus improve the efficiency of the combustion process for lower fuel charges.

By way of example, in an engine with a 500 cc cylinder and a 10-1 compression ratio, the combustion chamber volume should be 50 cc. For a low fuel charge, it might be desired to raise the compression ratio to 15-1, which requires the combustion chamber volume to be reduced to 33.33 cc. In an example engine with a primary piston of 55 mm radius and a secondary piston of 40 mm radius, the secondary piston should project 3.33 mm into the combustion chamber in order to reduce its volume by the required amount, and the strength of the spring supporting the secondary piston is calculated to achieve that result.

While the assembly of my U.S. Pat. No. 7,273,022 represents an improvement in conventional internal combustion engines, my present invention makes a further improvement in providing effective means for counteracting the inertial forces acting on the spring-supported secondary piston during the compression phase of the operating cycle. A typical internal combustion engine may operate at speeds of several thousand revolutions per minute of the crank shaft. Accordingly, even though the spring-supported secondary piston may be made of a lightweight material, the inertial forces acting upon it during a high speed compression stroke may be substantial enough to temporarily displace the secondary piston against the force of its supporting spring.

SUMMARY OF THE INVENTION

A significant feature of the present invention involves the provision of a movable spring support, which is slidably received within the primary piston and is engaged by a cam lobe provided on the upper end of the connecting rod. During the first 90° degrees of upward crankshaft rotation, from an initial bottom dead center position, the primary and secondary pistons are accelerated rapidly upward and the secondary piston is subject to high inertial forces tending to move the secondary piston downward against the force of the supporting spring. Pursuant to the invention, however, the cam lobe on the connecting rod progressively displaces the spring support upwardly to compress the spring toward the secondary piston, in order to resist the inertial forces acting thereon. During the next 90° degrees of rotation, between 90° and 180°, to a top dead center position, the secondary piston continues to be moved upwardly, but at a progressively decelerating rate, such that inertial forces of deceleration acting on it are progressively decreased. During this portion of the compression phase, the connecting rod swings back toward a vertical position and the cam lobe formed thereon progressively allows the sliding spring support to return to its original position within the primary piston. As the assembly approaches a top dead center position, the added compression of the spring is reduced to zero along with the inertial effects on the secondary piston, and the secondary piston is thus enabled to have the desired effect of adjusting the size of the combustion chamber in accordance with the fuel charge introduced therein

BRIEF DESCRIPTION OF THE DRAWINGS

For a more complete understanding of the above and other features of the invention, reference should be made to the following detailed description of a preferred embodiment of the invention and to the accompanying drawings, wherein.

DETAILED DESCRIPTION OF THE INVENTION

Figure 1:
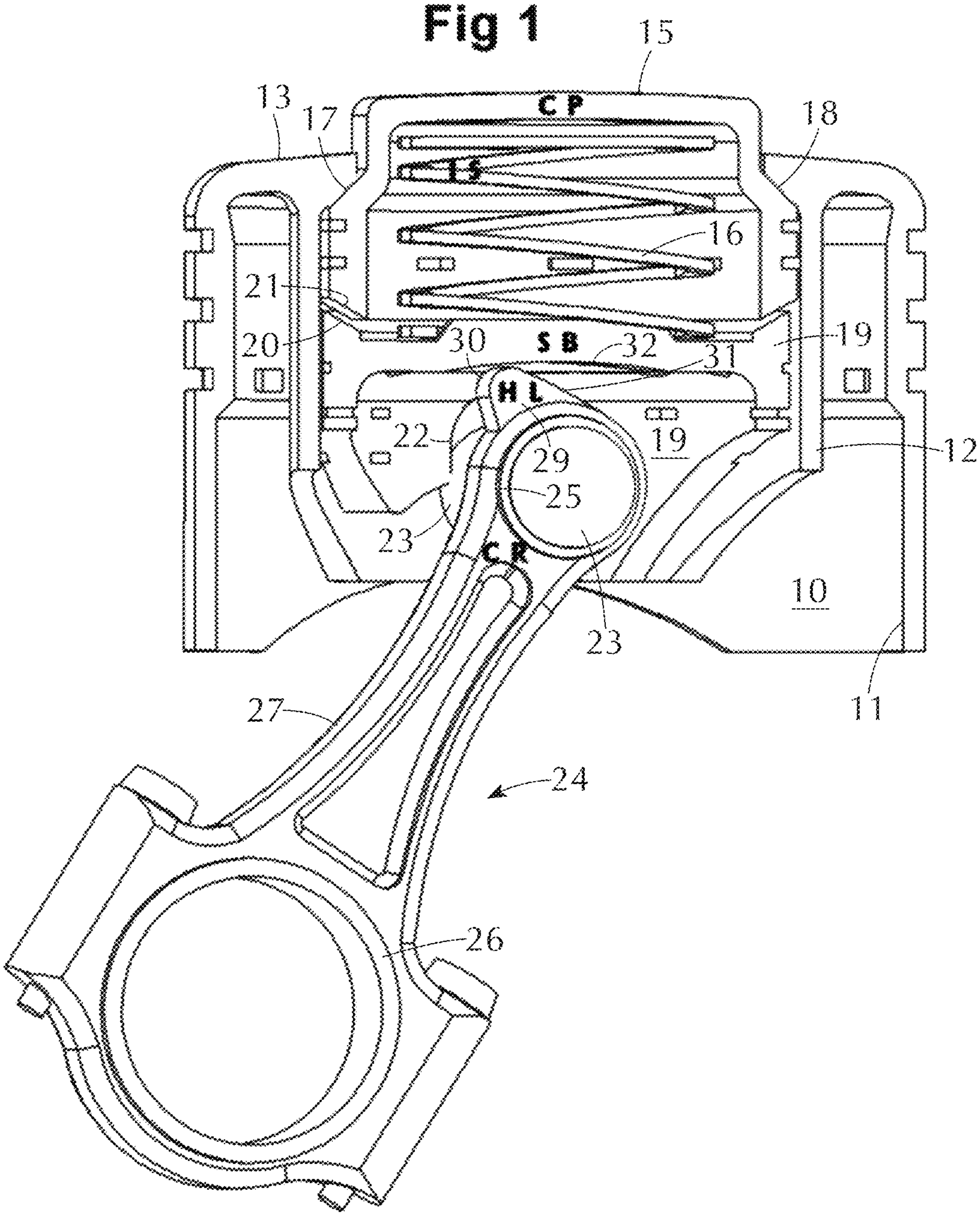
FIG. 1 is a perspective view, with parts shown in cross section, of a new piston and connecting rod assembly according to the invention, shown in a position during a compression phase in which a lower bearing of the connecting rod is in a position of maximum lateral displacement, as by 90° of rotation of a crank shaft from a bottom dead center position.
Figure 2:
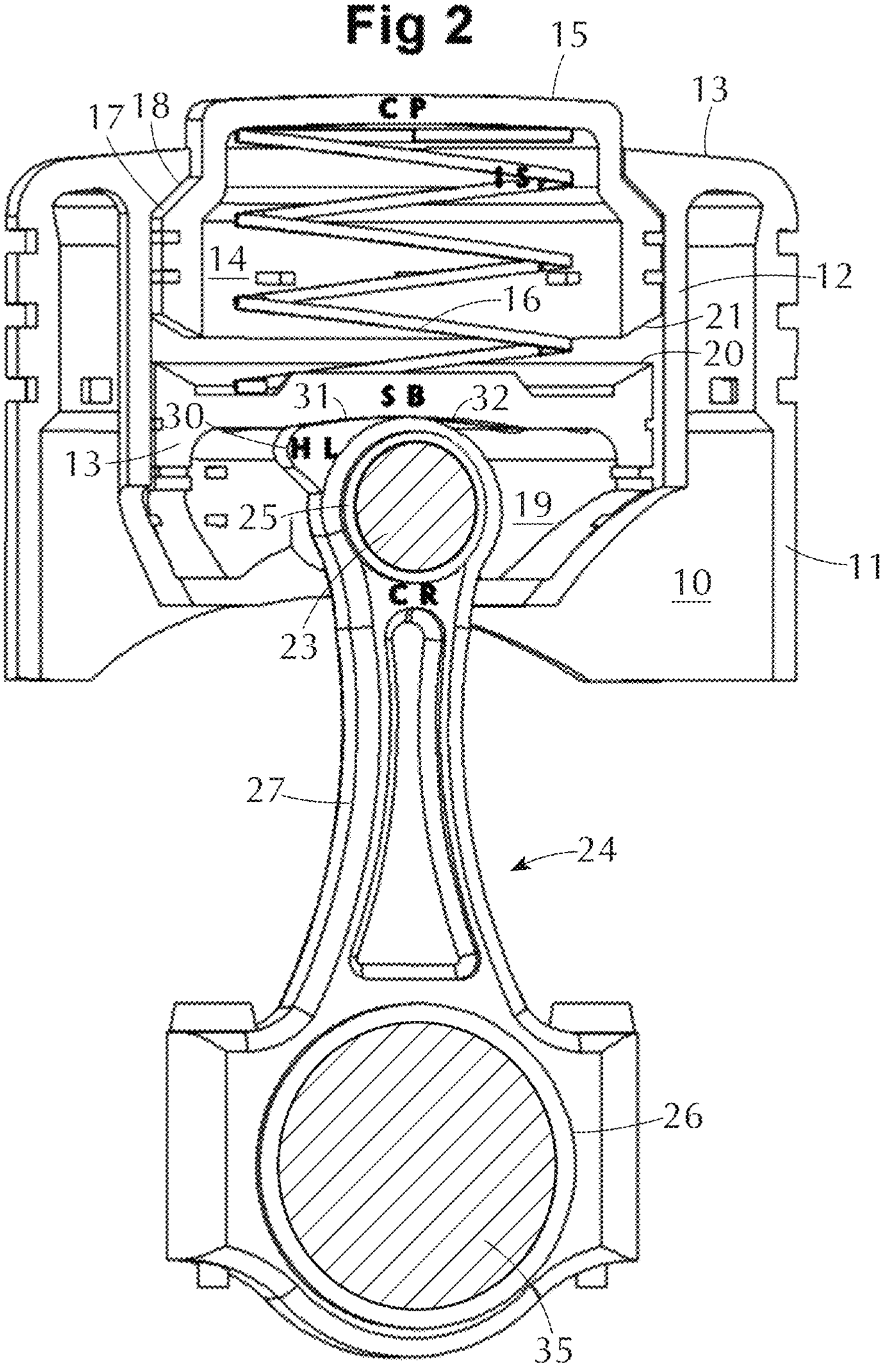
FIG. 2 is a perspective view, with parts shown in cross section of the assembly of FIG. 1, in which the connecting rod is in a vertical position, with the lower bearing of the connecting rod in a top or bottom dead center position of crank shaft rotation.

The embodiment of FIGS. 1 and 2 comprises a primary piston 10, which includes an outer cylindrical skirt 11 and an internal cylindrical skirt 12 joined at their upper ends by an annular top surface 13. A secondary piston 14 is slidably received by the internal skirt 12 and has an upper portion 15 projecting above the top surface 13 of the primary piston 10. A spring 16, bearing against the underside of the secondary piston 14, urges the secondary piston 14 upwardly to an upper limit position defined by an upwardly facing conical shoulder 17 on the secondary piston and a mating downwardly facing conical shoulder 18 on the primary piston 10. The conical shoulders 17, 18 form mutually engageable abutment surfaces, as shown in FIG. 2. It should be understood that directional references herein, such as up, down, top, bottom, upper, lower, etc., are for convenience of description only are not to be deemed as limiting. In this respect, an internal combustion engine may be operated in a variety of orientations, including horizontally and upside down.

In accordance with a feature of the invention, the lower end of the spring 16 is engaged by a spring support 19, which is slidably received in lower portions of the internal skirt 12 of the primary piston 10, below the secondary piston 14. At an upper portion thereof the spring support is provided with an upwardly/inwardly facing conical surface 20 which is engageable with a downwardly facing conical surface 21 of the secondary piston 14 when the secondary piston is under full load, during a downward power stroke of the piston assembly 10, 14, following combustion of a fuel charge. The spring support 19 is provided on diametrically opposite sides thereof with downwardly opening guide slots 22 which straddle a wrist pin 23 which serves to connect the primary piston 10 to a connecting rod 24. The upper extremities of the guide slots are of semicircular configuration, corresponding to the diameter of the wrist pin 23, such that the spring support 19, in its lowest position, can be seated on the wrist pin 23. The connecting rod 24 comprises an upper bearing 25, which engages the wrist pin 23, a lower bearing 26, which engages the crankshaft 35 of the internal combustion engine, and a stem 27 rigidly connecting the bearings 25, 26.

In accordance with a feature of the invention the upper end 28 of the connecting rod 24 is formed with an integral cam 29, which extends laterally and upward from the upper end 28 of the connecting rod and has a rounded lobe 30 at its outer end. As shown in FIG. 2, when the lower bearing is in a bottom dead center position or in a top dead center position, in which the connecting rod is vertical, the cam 29 presents an upwardly facing top surface 31 in the form of a shallow arc which engages a downwardly facing concave surface 32 on the bottom of the spring support 19. Desirably, the concave surface 32 may be formed of a low friction material, such as Teflon or titanium. Additionally, the spring support may be provided with small perforations to enable lubricant to reach the contacting surfaces.

As the crankshaft rotates clockwise from a bottom dead center position, as reflected FIG. 2, to a 90° position as shown in FIG. 1, during the compression phase of the engine cycle, the connecting rod rotates about the wrist pin 23 and the cam lobe 30 rotates to an elevated position relative to the wrist pin, elevating the spring support 19 and thus compressing the spring 16. The spring is progressively compressed as the crankshaft rotates from bottom dead center to the 90° position. During this rotational interval, the secondary piston 14 is progressively accelerated in an upward direction giving rise to inertial effects tending to displace the secondary piston 14 downwardly relative to the primary piston 10, and these inertial effect are mitigated or overcome by the progressive compression of the spring 16 by action of the cam lobe 30. Preferably, the secondary piston 14 is maintained in a fully projected position during this rotational interval of the crankshaft, with the conical surfaces 17, 18 in contact.

During clockwise rotation of the crankshaft between the 90° position and a top dead center position, constituting a second half of the compression phase, the primary and secondary pistons 10, 14 continue to be displaced upwardly. However, the rate of upward movement of the pistons is progressively reduced during this portion of crankshaft rotation, and the inertial effects acting on the secondary piston 14 are of deceleration and progressively decline, becoming zero as the connecting rod 24 reaches a top dead center position. Pursuant to the invention, as the connecting rod returns to a vertical position, at top dead center, the cam lobe 30 is rotated in a counterclockwise direction to progressively reduce the displacement of the spring support 19 relative to the primary piston 10 and thus the force of the spring 16 on the secondary piston 14. The described mechanism largely counteracts the inertial effects of rapid acceleration and deceleration on the secondary piston 14 during the compression phase, such that the action of the spring 16, at a top dead center position, determines the extent of combustion chamber penetration of the secondary piston 14 substantially exclusively as a function of the pressure of the fuel load gasses in the chamber.

For the example engine mentioned above, the cam lobe 30 should provide for a displacement of 3.33 mm in order to hold the secondary piston 14 fully projected during the compression phase while accommodating the desired retraction thereof at a top dead center position, as determined by the size of the fuel charge on each cycle.

With reference to FIG. 2, when the crankshaft rotates clockwise from a top dead center position the connecting rod 24 will be progressively tilted in a direction opposite to that shown in FIG. 1. Accordingly, the cam lobe 30 will be rotated in a counterclockwise direction, downward with respect to the spring support 19. However, the arcuate surface 31 of the cam merges tangentially with the upper end of the connecting rod 24, so that no motion is imparted to the spring support 19, relative to the primary piston 10, during the entire 180° of rotation between top dead center and bottom dead center positions.

The present invention significantly improves the operation of the piston assembly of my earlier U.S. Pat. No. 7,273,022 by substantially isolating and counteracting the inertial effects on the secondary piston of high speed reciprocation thereof during operations of an internal combustion engine. By mechanically adjusting the compression of the spring throughout the compression phase of the engine cycle, the secondary piston supported by that spring can more accurately adjust the compression ratio of the combustion chamber in accordance with the amount of the fuel charge introduced therein, on each cycle of operation.

It will be understood that the invention is not limited to the specific embodiment thereof illustrated and described herein. Accordingly, reference should be made to the following claims to determine the full scope of the invention.

What is claimed is:

1. In a piston and connecting rod assembly for an internal combustion engine, wherein the piston is comprised of a cylindrical primary piston having a concentric cylindrical internal skirt forming a concentric opening at the top of said primary piston, a secondary piston received in said cylindrical internal skirt for axial movement therein and having an upper portion exposed at an upper end of said internal skirt, and a spring supported at a lower end thereof and having an upper end acting in an axial direction on said secondary piston to urge said secondary piston toward an upper limit position with respect to said primary piston, said secondary piston being downwardly axially displaceable against the action of said spring, during compression strokes of said primary piston, as a function the volume of a fuel charge injected above said primary and secondary pistons, upper and lower ends of said connecting rod having upper and lower bearings respectively, said upper bearing being connected to said primary piston by a wrist pin and said lower bearing being engageable with a crank shaft of the internal combustion engine, the improvement which comprises:

a spring support received within the internal skirt of said primary piston for limited axial movement therein and supporting a lower end of said spring, a cam incorporated into an upper portion of said connecting rod and having a cam lobe adjacent to the upper bearing of said connecting rod and extending laterally and upwardly with respect to an axis of said connecting rod extending between said upper and lower bearings, said cam lobe being configured to engage and progressively upwardly displace said spring support relative to said primary piston during movement of said connecting rod lower bearing, by an engine crankshaft, from a bottom dead center position through an upward arc of 90°, and to accommodate controlled downward displacement of said spring support during movement of said connecting rod lower bearing through a further arc of 90° to a top dead center position.

2. The assembly of claim 1, wherein said secondary piston has an upper portion projecting above the top of said primary piston.

3. The assembly of claim 1, wherein said spring support has diametrically opposed, downwardly opening slots at opposite sides thereof slidably engaging said wrist pin and accommodating axial movement of said spring support relative to said wrist pin.

4. The assembly of claim 3, wherein upper ends of said downwardly opening slots are arcuately curved to conform to a cylindrical shape of said wrist pin.

5. A piston and connecting rod assembly for an internal combustion engine, for modifying the compression ratio of combustion chambers of said engine in real time, which comprises a primary piston having an external skirt of cylindrical form and an internal skirt of cylindrical form, and having a concentric opening in an upper surface thereof, at an upper end of said internal skirt, a secondary piston slidably received by cylindrical inner walls of said internal skirt and having an upper portion projecting through said concentric opening, mutually engageable abutment surfaces on said primary and secondary pistons to limit the extent to which the upper portion of said secondary piston may project above the upper surface of said primary piston, a spring positioned with an upper end engaging said secondary piston to urge said secondary piston axially upwardly relative to said primary piston, a spring support slidably received within said internal skirt and engaging a lower end of said spring, said spring support being axially slidable with respect to primary piston, a connecting rod having an upper end engaged with said primary piston by a wrist pin and a lower end engageable with a crank shaft of an internal combustion engine, the upper end of said connecting rod having a cam lobe positioned on one side thereof and engaging with said spring support, said cam lobe being configured and positioned to engage said spring support whereby, (a) when said connecting rod is in a top dead center position (180° rotation of the crank shaft) and when said connecting rod is in a bottom dead center position (0° rotation of the crank shaft) said spring support is in a lowermost position relative to said primary piston and said spring is under a predetermined minimum initial compression, (b) when said connecting rod moves from a 0° position to a 90° position of the crank shaft, during a compression phase of said primary and secondary pistons, the spring support is displaced axially upwardly relative to said primary piston to further compress the spring and thereby offset inertial effects tending to resist upward motion of the secondary piston, and (c) to allow said spring support to be progressively displaced axially downwardly relative to said primary piston during 90° to 180° rotation of the crank shaft to a top dead center position to offset inertial effects of deceleration acting on said secondary piston, whereby the action of said spring on said secondary piston at and near a top dead center position enables a controlled depression of said secondary piston relative to said primary piston as a function of the size of the fuel charge above said primary and secondary pistons to improve fuel combustion efficiency by increasing or decreasing the compression ratio of the combustion chamber as a function of a reduction or an increase in the fuel charge delivered to said combustion chamber.

6. The assembly of claim 5, wherein said predetermined initial compression of said spring is calculated to result in a desired displacement of the secondary piston as a function of the size of the fuel charge, to optimize the compression ratio of the combustion chamber, the controlled compression of said spring by said cam lobe, in combination with said predetermined initial compression, is sufficient to maintain the mutually engageable abutment surfaces in contact substantially throughout the compression phase of piston movement.

* * * * *